(12) United States Patent
Van Wiemeersch et al.

(10) Patent No.: US 9,197,094 B2
(45) Date of Patent: Nov. 24, 2015

(54) WIRELESS CHARGER AND CHARGING SYSTEM WITH MULTI-COMPATIBILITY

(71) Applicant: Ford Global Technologies, LLC, Dearborn, MI (US)

(72) Inventors: John Robert Van Wiemeersch, Novi, MI (US); Michael Hrecznyj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 13/788,461

(22) Filed: Mar. 7, 2013

(65) Prior Publication Data

US 2014/0253025 A1 Sep. 11, 2014

(51) Int. Cl.
*H02J 7/02* (2006.01)

(52) U.S. Cl.
CPC .............. *H02J 7/025* (2013.01); *Y02T 10/7005* (2013.01)

(58) Field of Classification Search
CPC ........................................................ H02J 7/025
USPC ......................................................... 320/108
See application file for complete search history.

(56) References Cited

U.S. PATENT DOCUMENTS

| | | | |
|---|---|---|---|
| 5,959,433 A | 9/1999 | Rohde | |
| 6,756,697 B2 | 6/2004 | Mizutani et al. | |
| 7,612,528 B2 | 11/2009 | Baarman et al. | |
| 7,868,585 B2 | 1/2011 | Sarnowsky et al. | |
| 8,120,316 B2 | 2/2012 | Sip | |
| 8,896,264 B2 * | 11/2014 | Partovi | 320/108 |
| 2009/0096413 A1 * | 4/2009 | Partovi et al. | 320/108 |
| 2009/0096414 A1 | 4/2009 | Cheng et al. | |
| 2010/0198428 A1 | 8/2010 | Sultan et al. | |
| 2010/0264871 A1 | 10/2010 | Matouka et al. | |
| 2011/0050164 A1 * | 3/2011 | Partovi et al. | 320/108 |
| 2011/0115303 A1 * | 5/2011 | Baarman et al. | 307/104 |
| 2011/0156637 A1 | 6/2011 | Thorsell et al. | |
| 2012/0235636 A1 * | 9/2012 | Partovi | 320/108 |
| 2013/0207455 A1 * | 8/2013 | Doljack | 307/9.1 |
| 2013/0217332 A1 * | 8/2013 | Altman et al. | 455/41.2 |
| 2014/0125279 A1 * | 5/2014 | Juhasz | 320/109 |
| 2014/0253025 A1 * | 9/2014 | Van Wiemeersch et al. | 320/108 |

OTHER PUBLICATIONS

"Wireless Power Receiver IC Complements Existing Transmitter," Power Electronics Technology, www.powerelectronics.com, Jul. 2011, pp. 15-17.

"Qi Compliant Wireless Power Transmitter Manager," Texas Instruments Incorporated, www.ti.com, document bq500210, Jun. 2011, Revised Aug. 2011, 25 pages.

(Continued)

*Primary Examiner* — Richard Isla Rodas
*Assistant Examiner* — Dung V Bui
(74) *Attorney, Agent, or Firm* — Frank MacKenzie; Price Heneveld LLP

(57) ABSTRACT

A wireless charger and charging system compatible with several wireless charging solutions is provided. The wireless charger includes a charging module having a transmitting member that transfers wireless power to a receiving member of a chargeable device so that a battery of the chargeable device can be charged. If the chargeable device is compliant with a recognized wireless charging solution, a charging session can be initiated and the charging module can charge the chargeable device using a charging protocol that is compatible with the wireless charging solution.

19 Claims, 5 Drawing Sheets

(56) References Cited

OTHER PUBLICATIONS

Ngo, Dong, "CES: Universal Wireless Charging ElectroHub to Demo at CES 2011," www.cnet.com/8301-32254_1-20024327-283.html, Dec. 1, 2010, 7 pages.

"System Description Wireless Power Transfer," vol. I: Low Power, Version 1.0.2, 119 pages, Copyright Wireless Power Consortium, Apr. 2011.

* cited by examiner

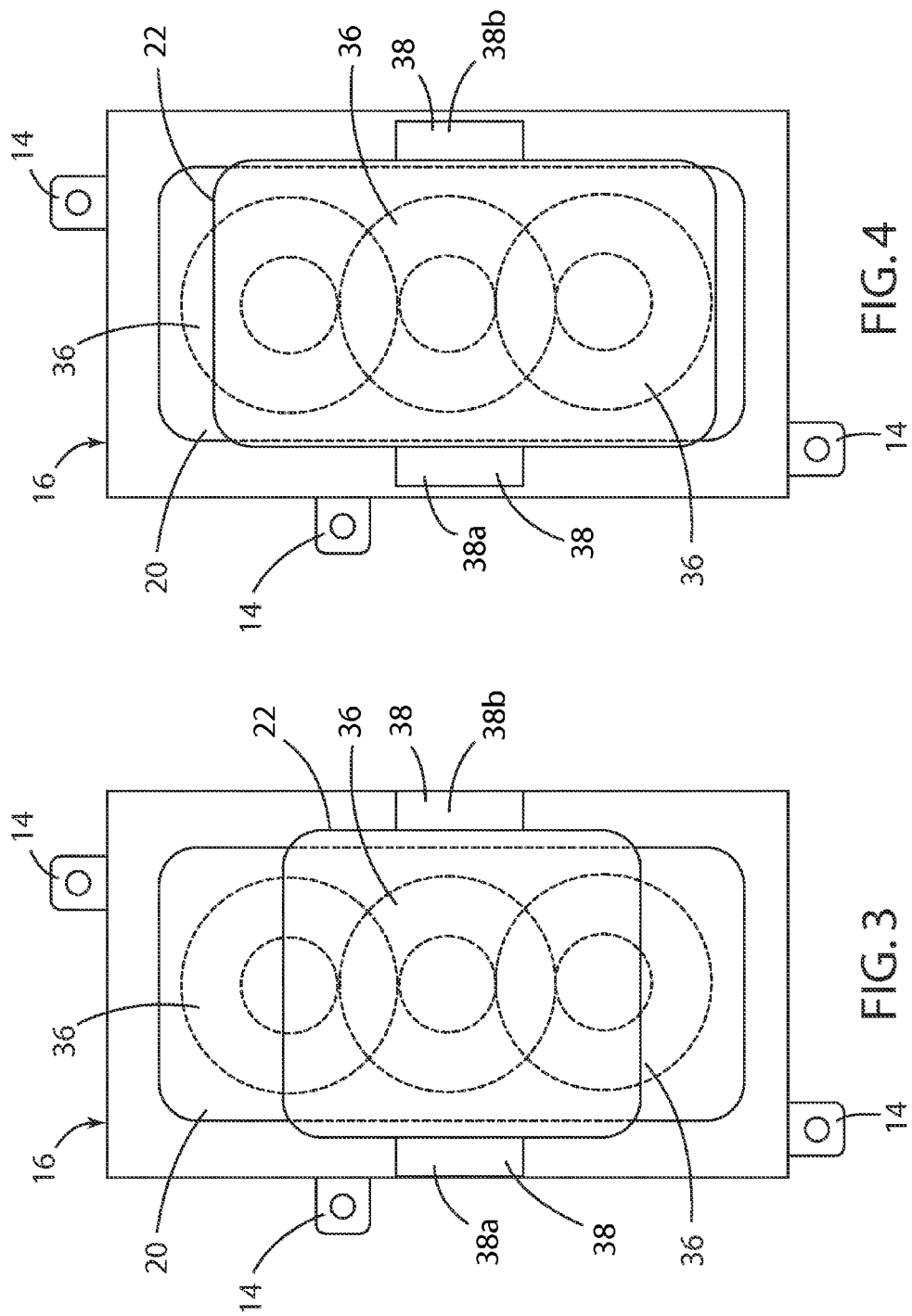

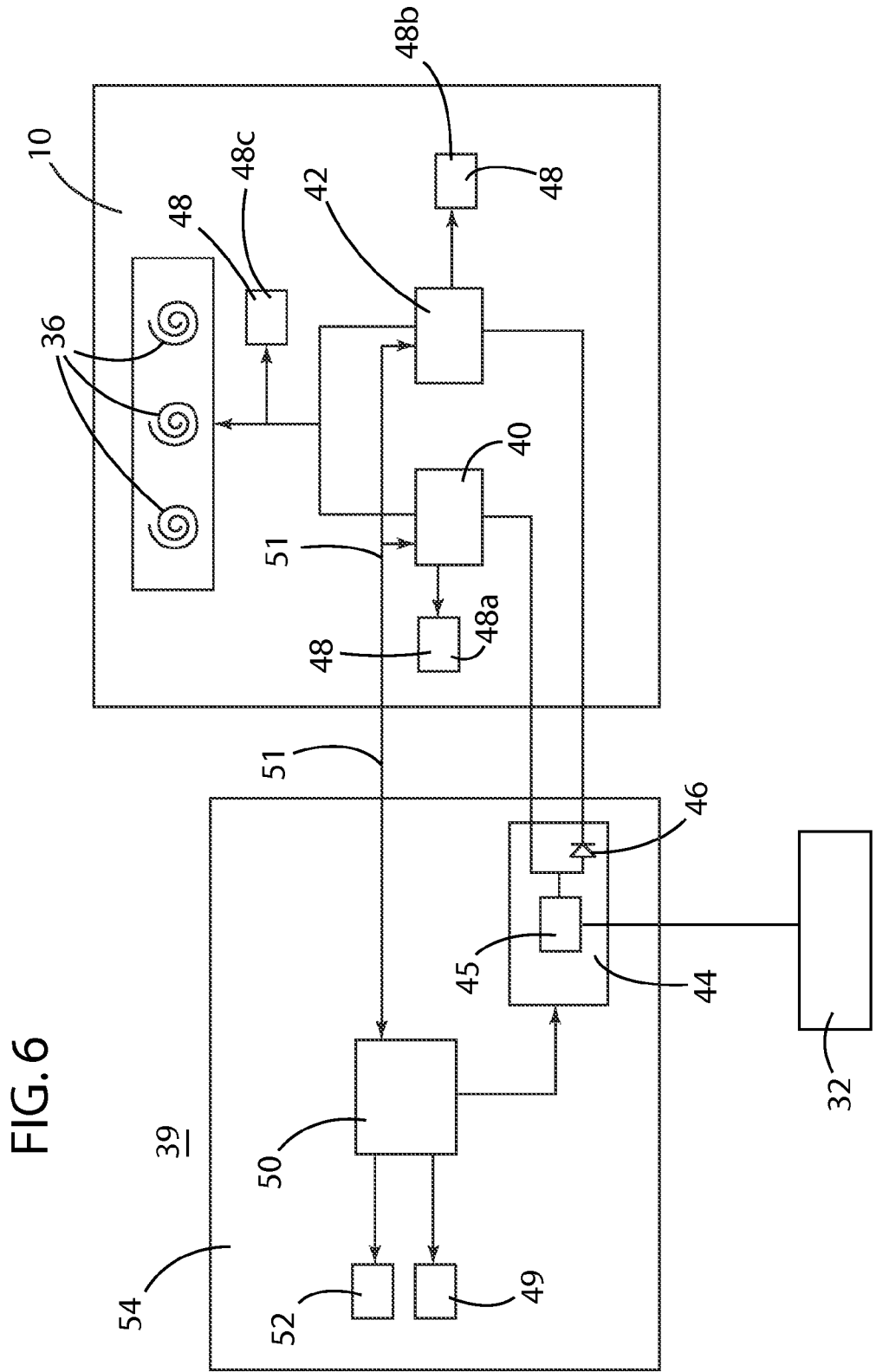

WIRELESS CHARGER AND CHARGING SYSTEM WITH MULTI-COMPATIBILITY

FIELD OF THE INVENTION

The present invention generally relates to a wireless charger and more specifically to a wireless charger that is compatible for use with a variety of wireless charging solutions.

BACKGROUND OF THE INVENTION

Wireless chargers are gaining in popularity and there currently exists a variety of wireless charging solutions to choose from. Typically, differing wireless charging solutions are incompatible with one another. For instance, two of the most popular wireless charging solutions feature Qi® and Powermat® charging technology. Unfortunately, Qi® compliant devices are unable to be charged by wireless chargers employing Powermat® charging technology, and vice versa. As such, users may be forced to rely on a single wireless charging solution or mix and match several wireless charging solutions to ensure their charging needs are met. Therefore, there is a need for a wireless charger that is multi-compatible with popular wireless charging solutions.

SUMMARY OF THE INVENTION

According to one aspect of the present invention, a wireless charger for a chargeable device is provided, wherein the chargeable device is compliant with a specific wireless charging solution and has a receiving member configured to receive wireless power. The wireless charger includes a charging module having a transmitting member configured to transfer wireless power to the receiving member according to a charging protocol that is selected from a plurality of charging protocols, the charging protocol being compatible with the specific wireless charging solution.

According to another aspect of the present invention, a wireless charging system of a vehicle is provided and is usable with a chargeable device that is compliant with a specific wireless charging solution. The wireless charging system includes a charging module configured to wirelessly charge the chargeable device according to a charging protocol that is selected from a plurality of charging protocols, the charging protocol being compatible with the specific wireless charging solution. The wireless charging system also includes a main module that is separated from the charging module and is configured to control the charging module.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a top view of one embodiment of the charging module, wherein a bumper assembly is shown in a first position securing a chargeable device having a first width;

FIG. 4 is a top view of one embodiment of the charging module, wherein the bumper assembly is shown in a second position securing a chargeable device having a second width;

FIG. 6 is a schematic diagram of the charging system for use in a vehicle, wherein the charging module functions as a satellite unit, and is controlled by a main module.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

To promote an understanding of the present invention, the embodiments described herein are referenced in a vehicular setting for purposes of illustration. However, it is to be understood that the present invention is adaptable to a variety of settings and is not limited for use in vehicles only.

Figure 1:
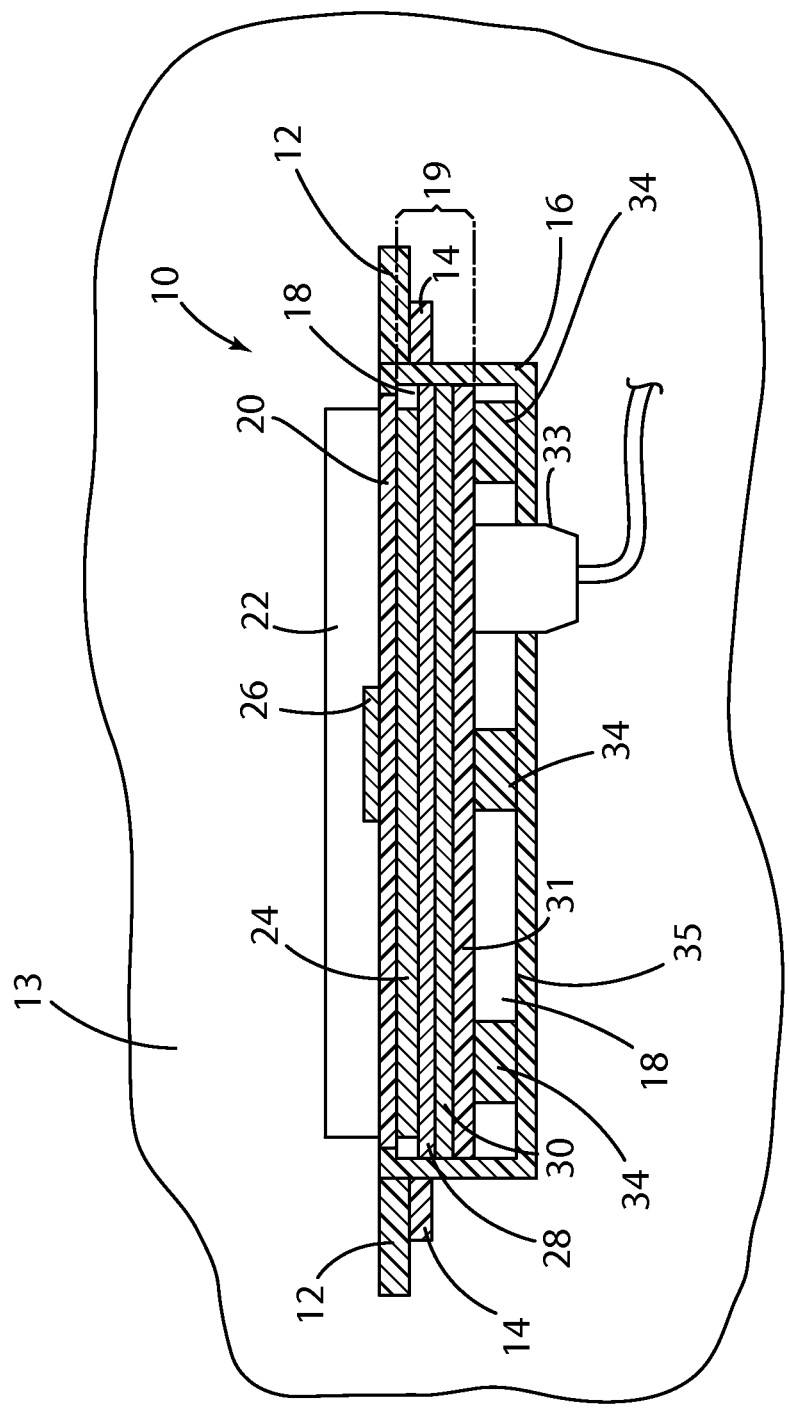
FIG. 1 is a side cross-sectional view of one embodiment of a charging module.

Referring now to FIG. 1, a charging module 10 is generally shown flushly mounted to a surface 12 in a vehicle interior 13. Preferably, the surface 12 is easily accessible and does not encumber the use of other features in the vehicle. One suitable surface 12 includes the center console area of the vehicle. To mount the charging module 10 to the surface 12, the charging module 10 may include a plurality of screw tabs 14 that are fastened to the underside of the surface 12.

The charging module 10 includes a body 16 that is preferably plastic and that defines an interior space 18 and a charging surface 20. The charging surface 20 is preferably a monochromatic Class A surface type and directly supports a chargeable device 22 such as a cellular phone or other portable electronic device that is compatible with the charging module 10. In the present embodiment, internal components are arranged in the interior space 18 in a tiered assembly 19. The first tier defines a transmitting member 24 configured to wirelessly transfer power to a receiving member 26 that is conventionally coupled to the chargeable device 22 for charging the battery of the chargeable device 22. The second tier defines a shielding member 28, such as a ferrite, to minimize the effects of the electromagnetic field (EMF) generated during wireless power transfer. The third tier defines a heat sink 30 that minimizes power dissipation and is preferably constructed from aluminum or copper. The fourth tier defines a printed circuit board 31 (herein referred to as PCB) that is configured to energize the transmitting member 24 to wirelessly charge the chargeable device 22. The PCB 31 is supplied power from a vehicle power source (not shown) and may be electrically coupled to the vehicle power source using a conventional vehicle wire harness 33. To support the tiered assembly 19, one or more support spacers 34 may be provided in the interior space 18 and disposed between the PCB 31 and a bottom surface 35 of the body 16.

Generally, the transmitting member 24 and receiving member 26 must be accurately aligned for optimum wireless charging to occur. This is particularly evident with respect to commonly used wireless charging solutions employing either Qi® or Powermat® charging technology, each offering a unique charging protocol for charging a variety of compliant devices fitted with their respective receiving members 26. Therefore, one challenge in providing a wireless charger with multi-compatibility is facilitating efficient wireless power transfer between the transmitting member 24 and the receiving member 26 given the likelihood that the position of the receiving member 26 and/or charging protocol will vary depending on the device itself and/or the adopted wireless charging solution.

Figure 2:
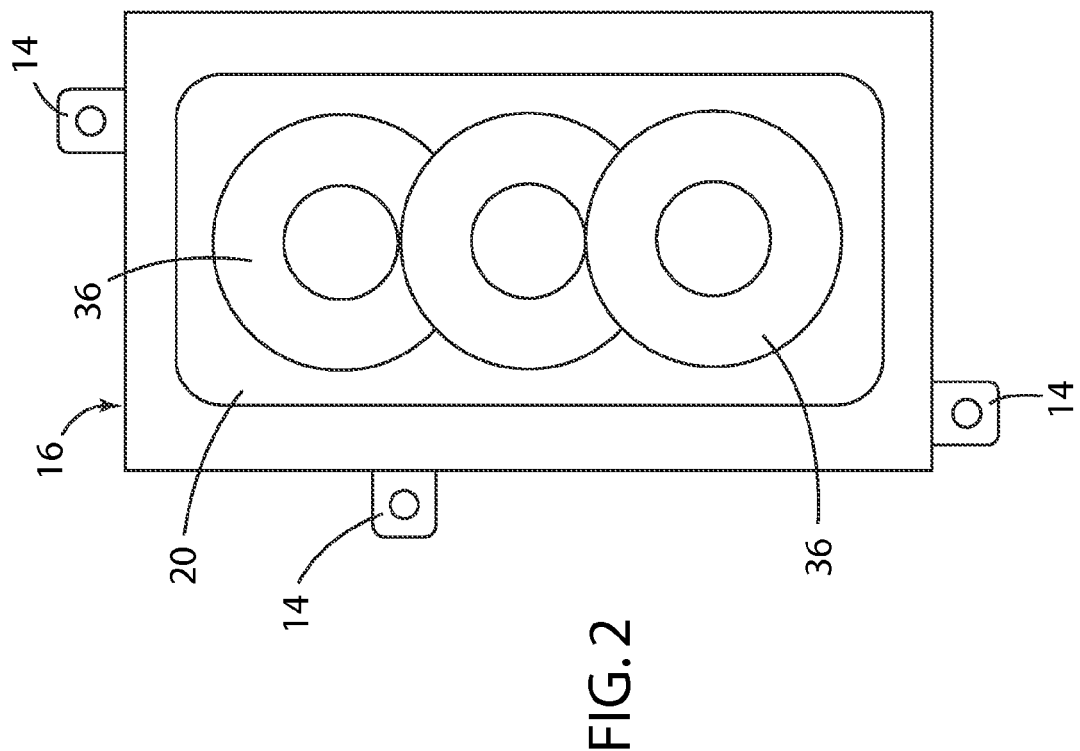
FIG. 2 is a top view of one embodiment of the charging module, wherein one possible configuration of the transmitting member is shown.

To address this challenge, one embodiment of the charging module 10 is generally shown in FIG. 2, and is configured to charge a chargeable device 22 based on the principles of wireless induction. In this embodiment, the transmitting member 24 includes one or more transmitting coils 36 configured to inductively transfer power to the receiving member 26 of a Qi® or Powermat® compliant device, which typically includes a receiving coil (not shown). As previously noted, the location of the receiving member 26 for any particular chargeable device 22 may not always be readily determined, which may hinder the ability to accurately align the transmitting member 24 and receiving member 26. To account for this, three transmitting coils 36, preferably having Litz wire windings, are arrayed in the present embodiment and configured to substantially coincide with the charging surface 20 to enable accurate alignment of at least one of the transmitting coils 36 with the receiving coil so that a charging session can be initiated.

To prevent the chargeable device 22 from moving and potentially causing the receiving coil to lose alignment with the transmitting coil(s) 36, a bumper assembly 38 or other suitable holding assembly may be employed, as shown in FIGS. 3 and 4. The bumper assembly 38 includes a first bumper 38a disposed opposite to a second bumper 38b, wherein each bumper 38a, 38b is configured to move in concert away from the center of the charging surface 20 to allow the chargeable device 22 to be inserted between each bumper 38a, 38b. Additionally, the bumpers 38a, 38b may be spring loaded with a bias favoring the return of each bumper 38a, 38b towards the center of the charging surface 20. In this manner, the bumper assembly 38 provides the necessary holding force to removably secure chargeable devices 22 of various widths to the charging surface 20 so that inductive charging can occur without interruption.

Figure 5:
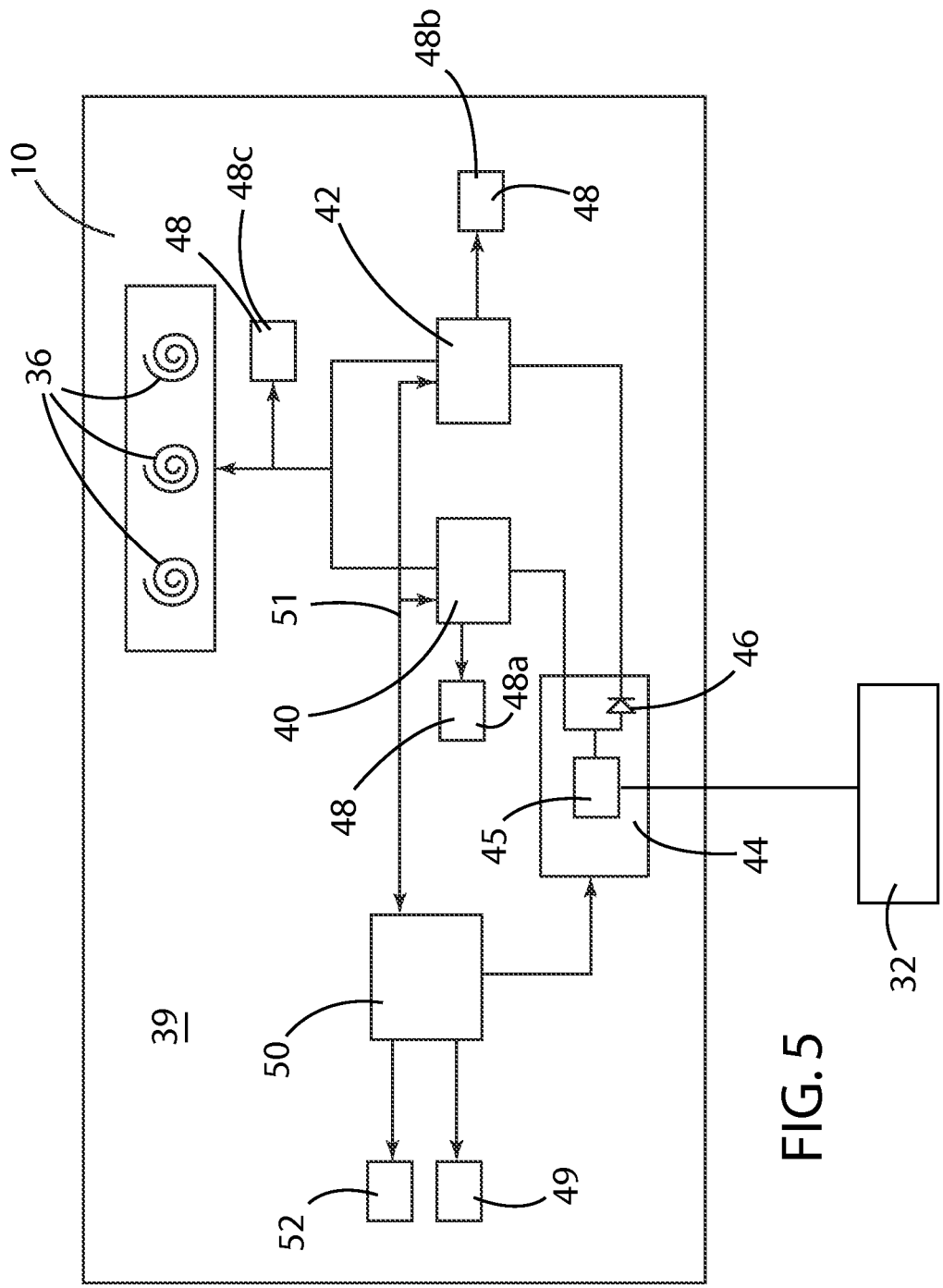
FIG. 5 is a schematic diagram of a charging system for use in a vehicle, wherein the charging module functions as a standalone unit.

Referring now to FIGS. 5 and 6, two schematic diagrams of a charging system 39 for use inside a vehicle are generally shown, wherein each charging system 39 is configured to wirelessly charge Qi® and Powermat® compliant devices and includes the charging module 10 of the previous embodiments.

As shown in each schematic diagram, the charging system 39 includes a first controller 40 and a second controller 42 that are each a part of the charging module 10. The first and second controllers 40, 42 are connected to the transmitting coils 36 and supplied by a power circuit 44. The first controller 40 is configured to trigger wireless charging based on the Qi® charging protocol and the second controller 42 is configured to trigger wireless charging based on the Powermat® charging protocol. It should be understood that the first and second controllers 40, 42 are configured to operate exclusively, such that when one is on, the other is off. Also, it should be noted that the Qi® and Powermat® charging protocols have different operating voltages. Typically, the Qi® charging protocol has a voltage requirement of approximately 19 volts DC whereas the Powermat® charging protocol has a voltage requirement of approximately 18 volts DC. To supply the first and second controllers 40, 42 with the required voltage, the power circuit 44 is connected to the vehicle power source, which typically provides 12 volts DC. The power circuit 44 includes a DC-DC converter 45 to convert the supplied voltage from 12 volts DC to 19 volts DC, thereby satisfying the voltage requirement of the first controller 40. To satisfy the voltage requirement of the second controller 42, a diode 46 may be added in series to the power circuit 44 to produce a voltage drop from 19 volts DC to 18 volts DC. As should be obvious to those skilled in the art, other circuit configurations may be employed to achieve the different voltage potentials.

Optionally, the charging system 39 may include one or more status indicators 48 configured to provide charging information to a vehicle occupant and may be provided on any viewable surface of the charging module 10. For example, a first and second status indicator 48a, 48b associated with the first and second charging protocols may be used to notify the vehicle occupant as to which charging protocol is in use. Also, the charging system 39 may include a third status indicator 48c used to inform the vehicle occupant as to the current charge state of the chargeable device 22. Preferably, each status indicator 48 is visually differentiated from the other so that the occupant can readily discern the type of information being provided. For example, a suitable first and second status indicator 48a, 48b may include a differently colored light and/or an illuminated logo for each associated charging protocol and a suitable third status indicator 48c may include an illuminated battery icon displaying a charge percentage and/or distribution.

The charging system 39 may also optionally include a USB port 49 to enable an occupant to forego wireless charging in favor of conventionally wire charging a chargeable device 22 by plugging it into the USB port 49. With the inclusion of the USB port 49, it is conceivable to simultaneously charge at least two chargeable devices 22, wherein one is charged using the USB port 49 and the other is charged using the charging module 10. It should further be appreciated that other wired charging connections may be employed.

Further included in the charging system 39 is a microcontroller 50 or other suitable processing unit that is configured to communicate with other charging system 39 components, such as the first and second controllers 40, 42 via a local interconnect network (LIN) 51 and communicates with the vehicle network via a controller area network (CAN) bus 52. As such, the added benefit of network connectivity opens the door to a variety of useful features that incorporate the charging system 39 with preexisting vehicle systems. For example, in instances where the vehicle battery becomes severely low, an active charging session may be selectively disabled to allow the vehicle battery to better support other vehicle systems. In another example, an interactive vehicle system such as the front center display and/or audio system, may be used to provide useful charging information such as the state of charge for a given chargeable device 22 or notify an occupant if an incompatible device is detected. In yet another example, the interactive vehicle system may also be used to notify an occupant if inadvertent dual charging is detected, which typically occurs when a chargeable device 22 being charged via the USB port 49 is also placed on the charging surface 20 to induce wireless charging and may potentially damage the chargeable device 22 and/or the charging system 39. While these are just a few instances benefiting from network connectivity, it should be obvious to those skilled in the art that many more useful applications are possible.

As shown in FIG. 5, the power circuit 44 and microcontroller 50 are both provided in the charging module 10. In this configuration, the charging module 10 may function as a standalone unit replete with built-in charging system 39 and requires only an external power source. As previously described, the charging module 10 may be integrated to the surface 12 of the vehicle using the screw tabs 14 or other suitable mounting assembly.

An alternative configuration is shown in FIG. 6, wherein the power circuit 44 and microcontroller 48 are provided in a main module 54 that is separate from the charging module 10 and may be integrated with any suitable vehicle structure and/or system. In this configuration, the charging module 10 functions as a satellite unit under the control of the main module 54, which initiates charge sessions and supplies the charging module 10 with power as a result of the inclusion of the power circuit 44 and microcontroller 50. Due to the absence of the power circuit 44 from the charging module 10, downsizing opportunities arise since the power circuit 44 and accompanying DC-DC converter 45 typically consume a large space relative to other charging system components. As a result, the charging module 10 may take on a smaller profile making it more easily accommodated in premium areas such as the center console, arm rests, and/or seatbacks of the vehicle. As previously described, the components in the main module 54 and charging module 10 benefit from network connectivity and it is therefore conceivable that additional charging modules 10 may be networked with the main module 54 to provide occupants with additional charging opportunities in a greater number of areas inside the vehicle.

In each configuration, the microcontroller 50 is tasked with initiating a charging session when a chargeable device 22 is detected on the charging surface 20 of the charging module 10. The chargeable device 22 may be detected using any of several known methods such as capacitive sensing, infrared camera, Bluetooth®, break beam sensor, and/or pressure switch. At the onset of the charging session, the microcontroller 50 first determines whether the chargeable device 22 is Qi® or Powermat® compliant. To do so, the microcontroller 50 begins an inductive query by pinging a receiver (not shown) of the chargeable device 22 with the last active charging protocol to gauge compatibility. Typically the receiver is specific to the particular charging protocol and comes prepackaged with the corresponding receiving member 26 and associated charging circuit, all of which are typically integrated with the chargeable device 22 or provided in a chargeable device 22 holder. If compatible, a handshake occurs between the microcontroller 50 and the receiver whereby the receiver indicates its presence by communicating received signal strength and control data to the microcontroller 50. If incompatible, then no handshake occurs between the microcontroller and receiver 26, which prompts the microcontroller 50 to switch to the next charging protocol in queue and start another inductive query. In this manner, it is conceivable to employ a plurality of selected charging protocols and loop through them in the above-described manner until the desired handshake occurs. If no compatible receiver is found at the completion of the inductive query, then the occupant may be notified that an incompatible device has been detected.

With respect to the charging system 39 of FIGS. 5 and 6, the last active charging protocol is either the Qi® protocol or the Powermat® protocol and is typically saved to a memory location of the microcontroller 44. In the event no last active charging protocol is available, one of the Qi® and the Powermat® charging protocols may be assigned as the default charging protocol for purposes of starting the inductive query.

Once the necessary charging protocol is determined, the wireless charging process may begin once at least one transmitting coil 36 is identified to be in accurate alignment with the receiving coil. At present, the Qi® charging protocol is operable using one or more transmitting coils 36 while the Powermat® charging protocol is relegated for use with a single transmitting coil 36. Thus, when charging a Powermat® compliant device, steps must be taken to determine which transmitting coil 36 is most accurately aligned with the receiving coil and then signaling the second controller 42 to trigger the Powermat® charging protocol using only the selected transmitting coil 36 to most effectively transfer wireless power to the receiving coil. One possible method includes configuring the microcontroller 50 to selectively connect each transmitting coil 36 to the power circuit 44 one at a time and selecting the transmitting coil 36 having the highest load power value, and therefore most accurate alignment, to charge the receiving coil while keeping the rest disconnected from the power circuit 44. Such a method is described in U.S. Pat. No. 8,120,316 B2 entitled "WIRELESS CHARGING SYSTEM" and filed on Aug. 13, 2009 by Kim-Yeung Sip, the entire disclosure of which is incorporated herein by reference.

For charging a Qi® compliant device, the microcontroller 50 may also select a transmitting coil 36 pursuant to the method outlined for the Powermat® charging protocol and subsequently signal the first controller 40 to trigger the Qi® charging protocol. Concerning Qi® compliant devices, if more versatility is desired, it is conceivable to configure the microcontroller 50 to select more than one transmitting coil 36 to more efficiently charge a Qi® compliant device in instances where the receiving coil is at least partially aligned with more than one transmitting coil 36. For example, if the two highest load powers identified are substantially similar, the microcontroller 50 may opt to use both of the corresponding transmitting coils 36 to charge the Qi® compliant device as opposed to selecting the transmitting coil 36 having the single highest load power.

Upon completion of the selected charging protocol or the premature removal of a chargeable device by an occupant, the microcontroller 50 saves the selected charging protocol to memory to serve as the last active charging protocol for the next charging session.

Accordingly, a wireless charger with multi-compatibility has been advantageously provided herein. The wireless charger is able to efficiently charge chargeable devices configured for different charging protocols such as Qi® and Powermat® compliant devices and may be particularly adapted for use in a vehicle and configured to communicate over the vehicle network.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A wireless charger comprising:
   a charging surface configured to receive a chargeable device thereon;
   at least one transmitting coil configured to inductively transfer power to at least one receiving coil associated with the chargeable device;
   a bumper assembly having a first and second bumper that are movable away from the charging surface to allow the chargeable device to be retained therebetween, wherein the first and second bumpers are biased to return toward the charging surface in order to provide a holding force against the chargeable device; and
a controller configured to ping different charging protocols, one at a time, to a receiver associated with the chargeable device and selecting a compatible charging protocol based on information received from the receiver.

2. The wireless charger of claim 1, wherein the charging protocols are ordered in a queue and the charging protocol occupying a first position in the queue is pinged first to the receiver.

3. The wireless charger of claim 2, wherein the selected charging protocol is assigned to the first position in the queue such that the selected charging protocol will be pinged first in a future charging session.

4. The wireless charger of claim 1, wherein when a charging protocol is pinged to the receiver, the controller assesses whether the pinged charging protocol is compatible with the chargeable device and if it is determined that the pinged charging protocol is incompatible, the controller pings another charging protocol.

5. The wireless charger of claim 1, adapted for use in a vehicle and connected to a vehicle power supply.

6. The wireless charger of claim 1, further comprising at least one indicator for identifying the selected charging protocol and a charge state of the chargeable device.

7. The wireless charger of claim 1, further comprising a USB port such that a first chargeable device may be charged by plugging the first chargeable device into the USB port and a second chargeable device disposed on the charging surface may be charged simultaneously with the first chargeable device by induction.

8. A wireless charging method comprising the steps of:
receiving a chargeable device on a charging surface;
moving a first and second bumper away from the charging surface to retain the chargeable device therebetween, where in the first and second bumpers are biased to return toward the charging surface in order to provide a holding force against the chargeable device;
pinging different charging protocols, one at a time, to a receiver associated with the chargeable device; wherein the charging protocols are ordered in a queue;
selecting a compatible charging protocol based on information received from the receiver; and
using the selected charging protocol to charge the chargeable device via induction.

9. The wireless charging method of claim 8, wherein the charging protocol occupying a first position in the queue is pinged first to the receiver.

10. The wireless charging method of claim 8, further comprising the step of assigning the selected charging protocol to a first position in the queue such that the selected charging protocol will be pinged first in a future charging session.

11. The wireless charging method of claim 8, wherein when a charging protocol is pinged to the receiver, the controller assesses whether the pinged charging protocol is compatible with the chargeable device and if it is determined that the pinged charging protocol is incompatible, the controller pings another charging protocol.

12. The wireless charging method of claim 8, further comprising the step of providing a USB port such that a first chargeable device may be charged by plugging the first chargeable device into the USB port and a second chargeable device disposed on the charging surface may be charged simultaneously with the first chargeable device by induction.

13. A wireless charger comprising:
a charging surface configured to receive a chargeable device thereon; and
a bumper assembly having a first and second bumper that are movable away from the charging surface to allow the chargeable device to be retained therebetween;
wherein the first and second bumpers are biased to return toward the charging surface in order to provide a holding force against the chargeable device.

14. The wireless charger of claim 13, further comprising a controller configured to ping different charging protocols, one at a time, to a receiver associated with the chargeable device and selecting a compatible charging protocol based on information received from the receiver, wherein when a charging protocol is pinged to the receiver, the controller assesses whether the pinged charging protocol is compatible with the chargeable device before pinging another charging protocol.

15. The wireless charger of claim 14, wherein the charging protocols are ordered in a queue and the charging protocol occupying a first position in the queue is pinged first to the receiver.

16. The wireless charger of claim 15, wherein the selected charging protocol is assigned to the first position in the queue such that the selected charging protocol will be pinged first in a future charging session.

17. The wireless charger of claim 14, adapted for use in a vehicle and connected to a vehicle power supply.

18. The wireless charger of claim 14, further comprising at least one indicator for identifying the selected charging protocol and a charge state of the chargeable device.

19. The wireless charger of claim 13, further comprising a USB port such that a first chargeable device may be charged by plugging the first chargeable device into the USB port and a second chargeable device disposed on the charging surface may be charged simultaneously with the first chargeable device by induction.

\* \* \* \* \*